United States Patent [19]

Loman

[11] Patent Number: 4,792,424
[45] Date of Patent: Dec. 20, 1988

[54] METHOD OF INJECTION MOLDING PVC PRODUCTS

[76] Inventor: Henricus G. M. Loman, 43, Aadorpweg, Wierden 7641 EK, Netherlands

[21] Appl. No.: 776,114
[22] PCT Filed: Jan. 10, 1985
[86] PCT No.: PCT/NL85/00002
§ 371 Date: Sep. 10, 1985
§ 102(e) Date: Sep. 10, 1985
[87] PCT Pub. No.: WO85/03027
PCT Pub. Date: Jul. 18, 1985

[30] Foreign Application Priority Data

Jan. 10, 1984 [NL] Netherlands .................. 8400082

[51] Int. Cl.⁴ .................. B29C 45/48; B29C 45/50; B29C 45/63
[52] U.S. Cl. .................. 264/102; 264/328.14; 264/328.17; 425/203; 425/205; 425/587
[58] Field of Search .......... 264/40.4, 328.14, 328.2, 264/101, 102, 174, 232, 328.17; 425/147, 203, 204, 205, 587

[56] References Cited

U.S. PATENT DOCUMENTS 3,911,069 10/1975 Fujita et al. .................. 425/113 X
3,913,796 10/1975 Aoki .................. 425/147

FOREIGN PATENT DOCUMENTS 1147057 4/1969 United Kingdom .
1375237 11/1974 United Kingdom .

Primary Examiner—Jeffery Thurlow
Assistant Examiner—Leo B. Tentoni
Attorney, Agent, or Firm—A. Robert Theibault

[57] ABSTRACT

The present disclosure is directed to a method of injection molding PVC products from powdered raw material, while employing an injection molding machine having a plasticizing unit having a rotary screw and a rotary screw and an injection unit having a screw which both rotates and reciprocates. The powdered raw material is subjected firstly to a prejellifying treatment during forced transportation through the plasticizing unit in which it is heated and brought to agglomerate in a relatively short time and the agglomerate is subjected to a vacuum after the prejellifying treatment and its introduction into the injection unit at an absolute pressure of less than 50 kPa.

3 Claims, 1 Drawing Sheet

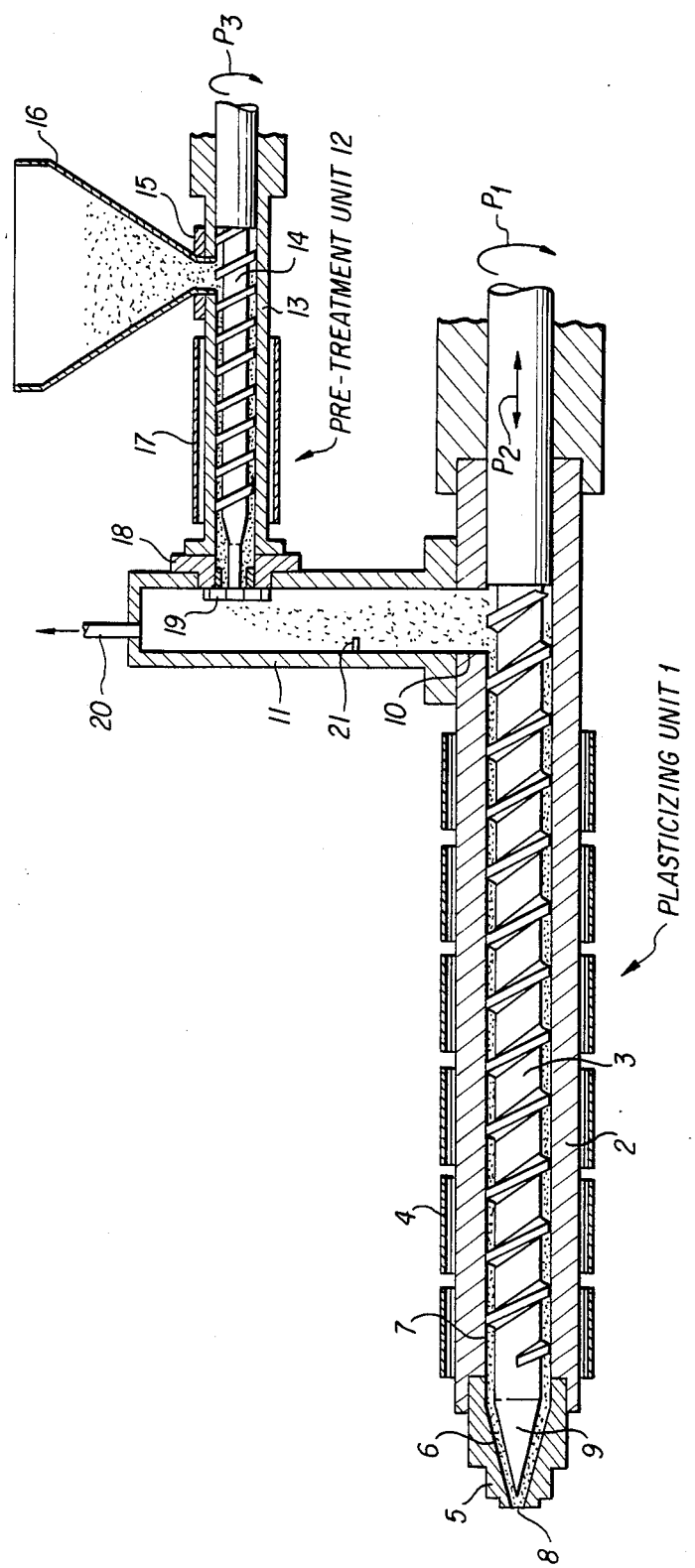

METHOD OF INJECTION MOLDING PVC PRODUCTS

The invention relates to a method of injection moulding PVC products from powdered raw material, while employing an injection moulding machine having an injection moulding unit of the cascade type having upper and lower screw extruders wherein the lower extruder has a reciprocating screw.

Injection moulding of PVC products from powdered raw material is known. This technology of manufacturing is particularly applied for producing tube fittings.

The PVC powder is thereby supplied from a hopper to the filling opening of the injection unit of an injection moulding machine. The rotating screw takes the powder and transports it forwardly in the direction of the injection nozzle. Under the influence of frictional forces caused by the rotating screw and heat which is supplied externally, the powder is plasticized and homogenized into a molten mass of a certain temperature. During rotation the screw moves backward until the amount of molten material required for moulding the product has been obtained in the space between the screw and the injection nozzle. Thereupon the rotary movement of the screw is stopped and, as soon as the injection mould is ready for it, the molten material is injected into the mould by axial movement of the screw towards the injection nozzle.

It is known to apply, with injection moulding apparatus, additional prejellifying apparatus, comprising a single screw transport device, whereby the adjustment of material supply occurs by adjustment of the speed of rotation of the transport screw. The degree of prejellifying, however, depends amongst other things, on this speed of rotation, by which this solution cannot be applied for PVC powder as base material. Certain problems for the greater part relate to the fact that PVC powder contains quite an amount of air and removing the gas from the material in the screw is very difficult. By an insufficient removal of gas, inclusions of gas and air in the molten material will be produced during plasticizing and consequently also in the injection-moulded product. Moreover, the material is homogenized less well because of the inclusions of air, so that locally the temperature of the molten mass will be increased too far and decomposition of the PVC will occur as a consequence of the small stability of PVC at high temperatures.

The consequence of these problems, sketched here only very summarily, is that the quality of products moulded by injection from PVC powder, is often open to criticism, both as regards the mechanical properties and as regards the appearance.

The object of the invention, therefore, is to attain an improvement of the quality for the art of injection moulding of PVC products from powder.

To this end, the method according to the invention is characterized in that the powdered raw material is subjected to a prejellifying treatment during forced transportation, in which it is heated and brought to agglomerate in a relatively short time, and subsequently in this condition is supplied to the upper injection extruder unit.

In this manner the material is densified on microscale, whilst on macro-scale, a coarse material structure is obtained. The raw material is heated until the outside is sticky whilst nevertheless it remains porous both in the interior of the particles and at the surface thereof.

Removal of the gas from the material in the screw is improved hereby, so that inclusions of air into the molten mass and into the injection-moulded final product, will be reduced and consequently an improvement of the quality of the final product is attained.

Generally speaking the removal of air from the raw materials has a great influence on the homogeneity and quality both of the molten mass and of the final product.

When a vacuum is applied at the location between the end of the prejellifying and the filling opening of the plasticizing screw, an absolute pressure is applied of less than 50 kPa, preferably, however, an absolute pressure of less than 20 kPa.

In this manner not only a removal of humidity from the raw material is realized, but also a removal of between half and more than 80% of the amount of air present in the agglomerated mass.

By applying a prejellifying device of the double screw type, as a means which will produce forced transport, the output of material can be adjusted very accurately.

Also the vacuum behind the prejellifying device will not draw any powder through this device. Moreover, with a device of double screw type the prejellifying treatment is produced to a considerable extent by the kneading so that the speed of rotation of the screws affects jellifying much less than with other types of prejellifying devices.

It has appeared that, with the method according to this invention, not only an improvement of the quality of the molten mass is obtained, but also that the plasticizing capacity of the injection moulding machine can be made considerably higher.

This is all the more of importance now that, in recent time, it turned out to be possible, by various measures, to reduce the cooling time in the moulds of injection-moulded products in general, but particularly the cooling time for tube fittings moulded from PVC powder, so that also the cycle time is reduced. In order to be able to utilize the advantage of this to a full extent, the plasticizing capacity of the injection moulding machine should be proportionally increased, because in less time the same amount of material for each "shot" has to be plasticized.

Generally speaking, for increasing the capacity of the injection unit various solutions are feasible.

One option is an increase of the number of revolutions of the screw. Particularly with PVC this has the disadvantage that the risk of burning of the material is increased. In practice, the circumferential speed of the screw is limited to a certain maximum value. Above this value friction between the screw and the material becomes too high and locally burning will occur.

Another option is supplying more material to the screw by greater depth of the thread.

Both options imply an increased energy input per unit time into the material. This energy must be produced through the screw which in practice often meets with problems because the power of the drive is limited. The result is that, in such case, the material is prejellified insufficiently and that lack of homogeneity will occur. The method according to this invention obviates all these problems to the greater part.

The result is that the plasticizing capacity can be increased by a factor 2 or even 2½, the product quality being better than without the measures according to the invention and with longer cycle times of the injection-moulding machine.

The invention will now be clarified with reference to the accompanying drawing of an exemplary embodiment of the apparatus.

The single FIGURE shows diagrammatically a longitudinal section through a plasticizing unit which is provided with a prejellifying unit according to the invention.

In known manner the injection unit, indicated as a whole by 1, comprises a cilindrical housing 2 in which a screw 3 is situated. Around the housing heating elements 4 are provided. The front end of housing 2 is provided with an injection nozzle 5. The latter has a substantially conical cavity 6 constituting a transition between the greater diameter of the internal space 7 of housing 2 and the smaller diameter of the aperture 8, with which the injection nozzle is connected to the mould. The pointed end 9 of screw 3 is also substantially conical, corresponding with the shape of cavity 6.

By means of a combined drive, not represented, the screw 3 is both rotatable, indicated by the arrow P1 and lengthwise movable, indicated by P2.

Near the rear end, housing 2 is provided with a filling opening 10, through which raw materials are supplied to the space between the screw thread. These raw materials are heated under the influence of frictional forces caused by the rotating screw and heating by the elements 4, and are thereby plasticized and consequently compressed and fed forwardly by the rotation of the screw.

On the housing at the location of the filling opening 10, a chamber 11 has been provided, the internal space of which matches the filling opening. To this filling chamber 11 raw material is supplied from the pretreatment unit 12. The latter comprises a screw feeder 13, known per se, the screw 14 of which is rotated according to the arrow P3 by a drive not represented. The screw feeder 13 presents a filling opening 15 above which there is a hopper 16 containing the PVC powder to be worked up.

Around screw feeder 13 a heating device 17 is provided. Screw feeder 13 is connected to chamber 11 while inserting a die plate 18 having a single, central passage which is narrowed as compared with the free passage of the screw feeder. At the side of die plate 18 which is situated within chamber 11, a plurality of rotary blades 19 is provided, moving past the apertures in die plate 18. Chamber 11 is provided at its top with a vacuum connection 20 and at an appropriate level between the output of screw feeder 13 at the location of the apertures in the die plate and the filling opening 10 of the injection unit a level sensor 21 is provided.

By applying the prejellifying unit alone, a considerable improvement of the quality of the molten mass, and therefore of the product, is obtained, also without applying vacuum. When, however, as in case of the embodiment described, vacuum is also applied, it is advantageous to take screw feeder 13 of the double screw type. This is a device known per se, in which two screws are provided in the housing which has a cross section in shape of an eight, where the threads of two screws interengage. Material situated in such a double screw can take a much higher pressure difference between feed and discharge side. The operation of the apparatus is as follows.

In screw feeder 13 the powdered PVC coming from the hopper is transported forwardly by the continuous rotation of screw 14. Thereby it is heated relatively fast. The overall dimensions are such that a certain agglomeration of the powder will take place, but that the material will not melt so much that closed pores will be produced.

An appropriate maximum temperature of the PVC in the screw feeder is about 140° C.

The agglomerated raw material at the output end of the screw feeder is cut into pellets by the rotary blades 19, and these pellets are collected near the bottom of chamber 11 by the opening 10 of the injection unit. By the vacuum in chamber 11 a considerable portion of the air, which is present in the pellets, will be removed. Through the filling opening 10 the pellets will reach, in a manner which is known per se, the internal space between the threads of the screw 3 in order that subsequently, under the influence of frictional forces, caused by the rotary screw and heating by the rotation of the screw, they are transported forwardly. As a matter of course the material which, in this way, finds itself in the screw 3, is still under the influence of the vacuum in chamber 11, so that the air, once removed, will anyhow not be replaced by other air, although in practice the process of removal of air will probably still go a little further.

In order to obtain a good removal of the air from the raw material, a vacuum has to be applied such that the absolute pressure will certainly be lowered to less than half the atmospheric pressure, so to below 50 kPa. According to the invention, however, preferably an absolute pressure at the location of the vacuum connection 20 of chamber 11 is applied which amounts to about 20 kPa or less.

Heating of the material in the injection unit 1, into a consistency appropriate for injection moulding, is produced in the prejellifying unit 12, by mixing action, preheating and the agglomeration with such a degree of uniformity that, even when the frequency of the strokes of the plasticizing screw, so that the cycle time of the injection moulding, is doubled, also the overall temperature of the molten mass at the location of the injection nozzle may be increased somewhat. In view of the not ideal uniformity up to now, the temperature has been kept at a value of 210°±20° C. When applying the idea of the invention a value of 220°±10° C. can be kept.

The apparatus can be adjusted such that the working speed of the prejellifying unit 12 is somewhat higher than that which corresponds with the capacity of the injection unit 1. In that case, when sensor 21 detects that a sufficient supply of prejellified raw material is present in front of the filling opening 10, a control signal can be deduced by which the speed of operation of the prejellifying unit 12 is reduced. So it will continue to rotate. In this way a possible product of lesser quality is provided.

I claim:

1. The method of injection molding PVC products from powdered raw material while employing an injection molding machine of a two stage cascade type having an upper plasticizing double screw extruder and a lower injection apparatus having one injection screw, wherein the raw material is subjected to a prejellifying treatment during forced transportation of the powdered raw material through the upper plasticizing screw extruder unit in which it is heated and brought to an agglomerated state in a relatively short time, subjecting the plasticized material to a vacuum while passing through the lower injection unit.

2. The method of claim 1 wherein during the prejellifying the material is heated to about 140° C.

3. The method of claim 2 wherein the vacuum is applied at the location between the end of the prejellifying treatment and the filling opening of the injection unit down to an absolute pressure of less than 50 kPa.

* * * * *